US012040146B2

(12) United States Patent
Vanevenhoven et al.

(10) Patent No.: US 12,040,146 B2
(45) Date of Patent: Jul. 16, 2024

(54) HARDWARE PROTECTION FOR CONTACTOR DRIVER INDEPENDENCE

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Jef William Good, German Valley, IL (US); Shane R. Traser, Rockford, IL (US); John N. Buzzard, Rockford, IL (US); Kyle Stephen Ives, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 254 days.

(21) Appl. No.: 17/522,124

(22) Filed: Nov. 9, 2021

(65) Prior Publication Data

US 2023/0145311 A1 May 11, 2023

(51) Int. Cl.
*H01H 47/00* (2006.01)

(52) U.S. Cl.
CPC .................................. *H01H 47/001* (2013.01)

(58) Field of Classification Search
CPC ........... H01H 47/001; H01H 9/54; H01H 9/56
See application file for complete search history.

(56) References Cited

U.S. PATENT DOCUMENTS 4,051,421 A 9/1977 Brinner et al.
4,769,737 A * 9/1988 Ogita ........................ H01H 9/56 307/137
5,065,047 A * 11/1991 Igari .................. G01R 19/0038 326/14
6,147,545 A * 11/2000 Marshall ............ H03K 17/6871 327/410
10,477,626 B2 11/2019 Tran et al.
10,928,450 B2 2/2021 Mechlinski et al.

FOREIGN PATENT DOCUMENTS

CN 109038795 B 6/2021
EP 0244642 A2 11/1987
EP 3561838 A1 10/2019
GB 2175466 A 11/1986

OTHER PUBLICATIONS

European Search Report for Application No. 22203087.6, mailed Mar. 29, 2023, 11 pages.

* cited by examiner

*Primary Examiner* — Daniel D Chang
(74) *Attorney, Agent, or Firm* — CANTOR COLBURN LLP

(57) ABSTRACT

A closing mechanism controller includes contactor operating logic that generates a software or firmware based closing mechanism command signal. The controller also includes hardware interlock circuitry that generates an interlock signal, the hardware interlock circuity being configured to compare an interlock signal to the software based closing mechanism command signal and to provide an enable signal to the closing mechanism when the interlock signal matches the closing mechanism command signal.

16 Claims, 4 Drawing Sheets

HARDWARE PROTECTION FOR CONTACTOR DRIVER INDEPENDENCE

BACKGROUND

The following description relates to controlling electrical contactors and, more particularly, to protecting hardware from erroneous behavior due to software or firmware.

Contactor assemblies are used in electrical applications, such as aircraft power distribution systems, where power and current flow control of a multi-phase power distribution system is required. A primary power distribution assembly typically has a panel on which several electrical contactors are mounted.

Each of the contactors is connected to an electrical bus bar and allows current to flow through the contactor and the corresponding bus bar whenever the contactor is in a closed position. The electrical power and current flow through the contactors is controlled by mechanically actuating a contact plate within the contactor such that, when current flow is desired to pass through the contactor, the contact plate is pushed into electrical contact with two leads and forms an electrical path coupling the leads and thereby allowing current to flow through it.

In aerospace electric power generation and distribution systems, electric power is provided from power sources such as generators, Transformer Rectifier Units (TRUs), and batteries to load buses or between load buses via such contactors. In the event of a failure, contactors may be closed to provide power from an alternate power source or opened to prevent cascading failure effects. Additionally, the auxiliary status of these contactors may be used as logic inputs for system re-distribution or source activation, among other functions.

These contactors may be controlled by control units such as generator control units or bus power control units. Determination for whether these contactors should be open or closed is performed in controller software or firmware based on a number of inputs such as generator voltage, bus voltage, TRU voltage, etc. pending the controller type.

BRIEF DESCRIPTION

Disclosed is a closing mechanism controller. The controller includes contactor operating logic that generates a software or firmware based closing mechanism command signal. The controller also includes hardware interlock circuitry that generates an interlock signal, the hardware interlock circuity being configured to compare an interlock signal to the software based closing mechanism command signal and to provide an enable signal to the closing mechanism when the interlock signal matches the closing mechanism command signal.

In addition to one or more of the features described above, or as an alternative to any of the foregoing embodiments, the interlock signal can be based on a circuit signal related to a circuit that is affected by closing the closing mechanism.

In addition to one or more of the features described above, or as an alternative to any of the foregoing embodiments, the interlock signal can indicate the presence of an AC voltage at the input of a transformer.

In addition to one or more of the features described above, or as an alternative to any of the foregoing embodiments, the interlock signal can indicate that external power is being provided onto an aircraft.

In addition to one or more of the features described above, or as an alternative to any of the foregoing embodiments, the closing mechanism can be a contactor and the hardware interlock circuitry generates a contactor enable signal.

In addition to one or more of the features described above, or as an alternative to any of the foregoing embodiments, the hardware interlock circuitry can include a comparator, a latch and output logic.

In addition to one or more of the features described above, or as an alternative to any of the foregoing embodiments, the comparator compares the circuit signal to a reference value and generates a comparison signal based on the comparison.

In addition to one or more of the features described above, or as an alternative to any of the foregoing embodiments, the latch latches in the comparison signal if the comparison signal is positive for longer than a predetermined time such that the comparison signal is provided as the interlock signal on an output of the latch.

In addition to one or more of the features described above, or as an alternative to any of the foregoing embodiments, the output logic compares the interlock signal to the software or firmware based closing mechanism command signal to generate the enable signal.

In addition to one or more of the features described above, or as an alternative to any of the foregoing embodiments, the closing mechanism can further include an override element connected between an output of the latch and the output logic. The override element is connected to one or more additional circuit signals and the interlock signal and will provide a positive output if any of the additional circuit signals or the interlock signal is positive.

In addition to one or more of the features described above, or as an alternative to any of the foregoing embodiments, the latch can include an S-R flip flop.

In addition to one or more of the features described above, or as an alternative to any of the foregoing embodiments, the comparison signal can be connected to a set (S) input of the S-R flip flop and an inverted and delayed version of the comparison signal is connected to a reset (R) input of the S-R flip flop.

In addition to one or more of the features described above, or as an alternative to any of the foregoing embodiments, the interlock signal can be provided on a Q output of the S-R flip flop.

Also disclosed is a contactor system. The system can include a contactor that connects an input to an output based on a contactor enable signal and a contactor controller as disclosed in any prior embodiment.

The output of the contactor can be connected to a bus bar and the input is connected to a generator.

In any prior embodiment, the contactor controller can be part of a generator control unit of the generator.

In any prior embodiment, the contactor controller can be part of a bus power control unit In any prior embodiment, the contactor controller can be part of a motor control unit.

In an prior embodiment, the contactor controller can be part of an inverter control unit

BRIEF DESCRIPTION OF THE DRAWINGS

The following descriptions should not be considered limiting in any way. With reference to the accompanying drawings, like elements are numbered alike.

DETAILED DESCRIPTION

Figure 1:
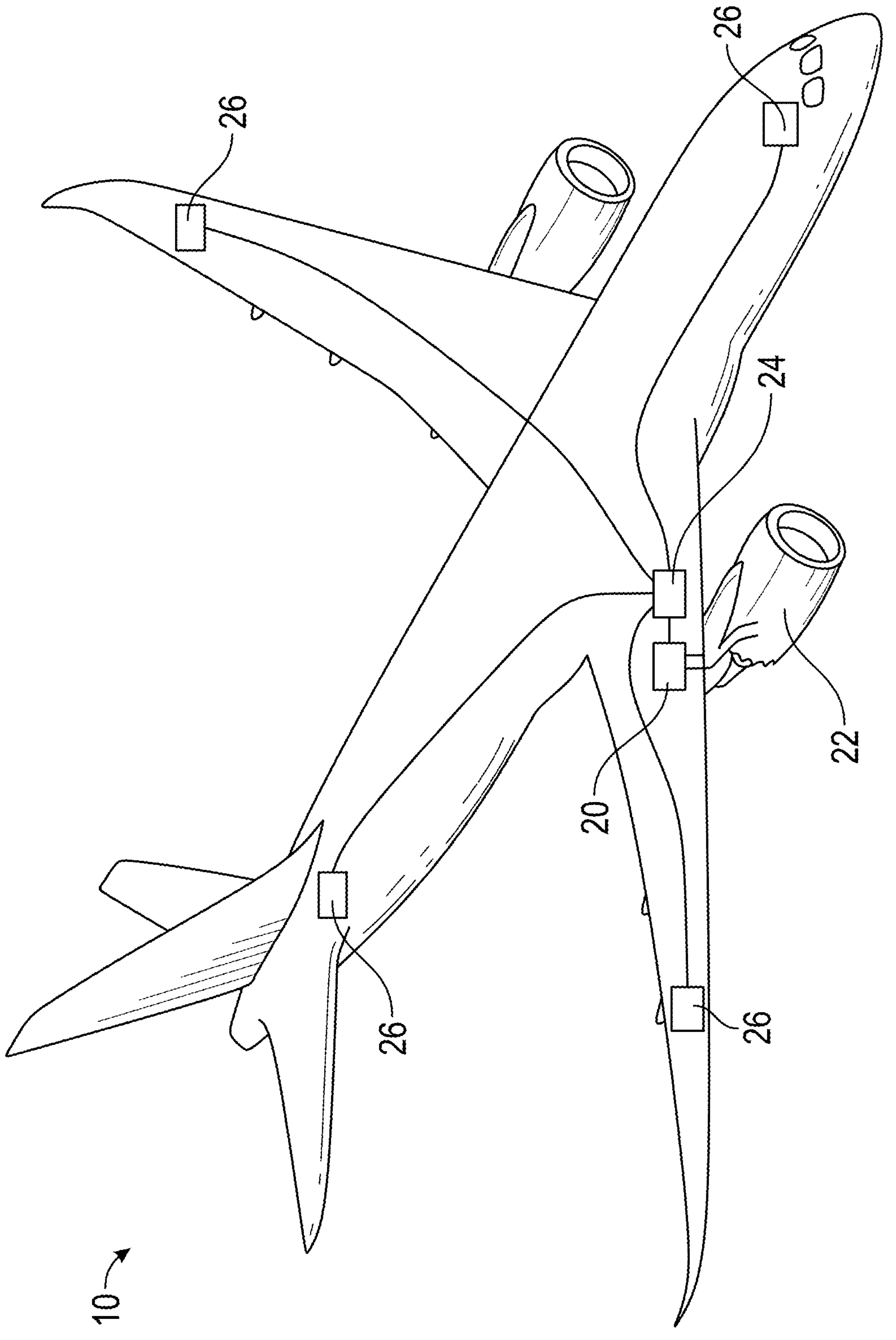
FIG. 1 is a perspective view of an aircraft in accordance with embodiments.

While the invention is further discussed below, it has been discovered that while the current fail-safes utilized in the industry may be effective, certain improvements can be made. In particular, the effect of failures or erroneous behavior of controllers on the electric system is one aspect of system safety and design. Depending on the failure condition hazard classifications associated with the sources or buses, compliance with safety requirements has resulted in the addition of items such as separate Line Replaceable Units (LRUs) like Power Quality Monitors or AC relays to provide a means independent from the controller firmware or software to open the associated contactors. These additional components may be large, costly, and increase weight. An alternative solution is provided herein for cases where independence from erroneous firmware and software behavior is required. This solution can be provided in the contactor controller circuitry.

In more detail, to achieve hardware independence from erroneous controller software or firmware behavior resulting in contactors being erroneously commanded closed, the controller circuitry is modified to inhibit the closing mechanisms (e.g., a coil/solenoid driver circuit) from being active unless certain conditions are met. In short, for the controller circuity to cause the contactor to close, both the software and a hardware-based interlock signal must agree.

The solution is hardware based and can include a latch. An operating value (such as a bus voltage) is sensed via analog circuitry and compared in hardware against a reference value. If the criteria for that comparison is satisfied, an interlock signal is set to a value (typically a digital “1”). That signal can be called a hardware based interlock signal herein. If the criteria for comparison is no longer satisfied, the interlock signal will be reset. This reset can include a requirement that the comparison not met be for longer than some determined amount of time to account for power variations.

The interlock signal can be compared against a closing mechanism command signal that was determined by the controller software/firmware. If the interlock signal is inactive, a contactor enable signal is not sent (e.g., is set to logical “0”) and the contactor will remain off regardless of the closing mechanism command signal from the controller software/firmware. If both the interlock signal and the closing mechanism command signal are active (e.g., a logical 1) a contactor enable signal is sent to the contactor and the contactor is closed.

Example applications include the use of POR voltage (possibly qualified with something like exciter current) to determine if a generator line contactor can be closed, AC bus voltage or frequency for a bus tie contactor or transformer/relay unit (TRU) contactor, TRU voltage for a TRU contactor, etc.

A detailed description of one or more embodiments of the disclosed apparatus and method are presented herein by way of exemplification and not limitation with reference to the Figures.

With reference to FIG. 1, an aircraft 10 is provided and includes an electrical power distribution system 20 which utilizes rotation within the jet engines 22 to generate either single phase or three phase electrical power. The power is sent to a panel box 24 that contains multiple electrical buses and contactor assemblies for controlling how the power is distributed throughout the aircraft 10. Through the use of the contactor assemblies, power may be controlled for each onboard electrical system 26 independently.

Figure 2:
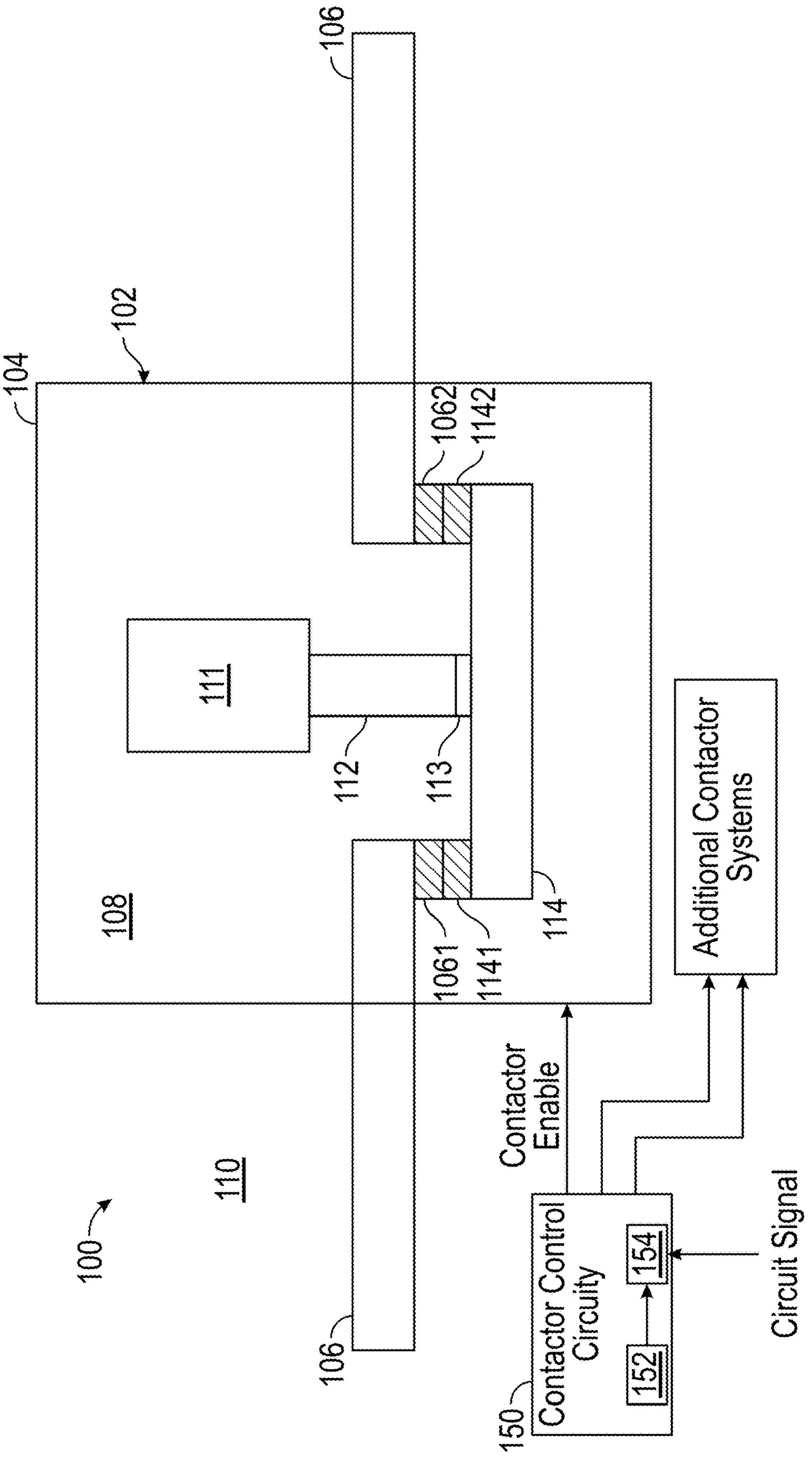
FIG. 2 is a block diagram of a contactor system that includes control circuitry with hardware contactor control/enable according to embodiments.

An exemplary panel box 24 includes multiple bus bars that can be connected to various aircraft systems by contactor assemblies (or simply contactors). Not by way of limitation but for example only, FIG. 2 shows an example of a contactor assembly 100 of panel box 24 (see FIG. 1). The contactor assembly 100 includes an electrical contactor 102 that in turn includes a housing 104 and internal bus bars 106. The housing 104 is formed to define an interior 108 and the internal bus bars 106 extend into the interior 108 from an exterior 110 of the housing 104.

The contactor assembly 100 further includes a contactor actuator 111 that can be, for example, a solenoid, a plunger 112 with an insulator 113 at a distal end thereof and a movable bus bar 114. At a central portion thereof, the movable bus bar 114 is coupled to the plunger 112 via the insulator 113. At opposite ends thereof, the movable bus bar 114 includes contact pads 1141. The movable bus bar 114 is movable by the contactor actuator 111 into a first position and a second position.

At the first position, the contact pads 1141 of the movable bus bar 114 contact the stationary contact pads 1061 and 1062 such that the corresponding individual internal bus bars 106 are electrically coupled with one another. At the second position, the contact pads 1141, 1142 are displaced from the stationary contact pads 1061 and 1062 such that the corresponding internal bus bars 106 are decoupled from one another.

Thus, in operation, the electrical contactor 102 is operable in a first mode or in a second mode. In the first mode, corresponding internal bus bars 106 are electrically coupled with each other in the interior 108 of the housing 104. In the second mode, the corresponding internal bus bars 106 are electrically decoupled from one another in the interior 108 of the housing 104.

In FIG. 2, whether or not contactor actuator 111 moves the bus bar 114 into the first or second position is based on a contactor enable signal received from the contactor control circuitry 150. That circuitry 150 can include both typical operating logic 152 and a hardware interlock circuitryl 54 as disclosed herein. The contactor control circuitry 150 can be, for example, in generator/motor control unit, in an inverter control unit, or in a bus power control unit (e.g,. in a controller in the panel box 24) to name but a few.

The typical operating logic 152 can be any hardware of software (or combination thereof) that is used to determine whether a particular contactor should be opened of closed. Determination of whether a particular contactor should be open or closed is performed in controller software or firmware in the logic 152 and can be based on a number of inputs such as generator voltage, bus voltage, TRU voltage depending on the controller type.

The interlock lock circuitry 154 receives the signal from the logic 152 and based on its own logic either passes or blocks the signal from the logic 152 from being transmitted to the contactor as the contactor enable signal. The signal can, for example, be a binary signal that is a logical 1 when the contactor is to close and a logical 0 when the contactor is to open. Of course, the values could be reversed. Also, in one embodiment, the contactor enable signal causes a current to be provided to the actuator 111 to cause the plunger to move.

As mentioned above, the interlock lock circuitry 154 will either pass or block the signal from the logic 152. In one embodiment, this determination is based on whether a particular value in the system (e.g,. a voltage or current in the panel box 24 of FIG. 1 or a generator that includes the contactor control circuitry 150) meets a certain criteria. As such, in FIG. 2, a "circuit signal" is shown as being received by the interlock lock circuitry 154. This signal is shown as a single signal but can be composed of multiple signals. Such signals include signals that will become part of the circuit when the closing mechanism is closed. For example, if the contactor is connecting a bus bar to the input of a generator, a signal that is present on the bus bar or in the generator can be used as part of the circuit formed when the contactor closes. Of course, other signals that are not necessarily part of the completed circuit could also be used depending on the context.

Examples of the circuit signals that can be used include, without limitation, a GCU (generator control unit) location identifying signal, an external power monitor (EPM) identifying signal, a point of regulator (POR) signal such as a phase-based POR or any other voltage. In the case of a GCU signal, the generator control unit is what controls the voltage output of the ac generator for the system. There are typically multiple generators (at least one per engine) on aircraft for redundancy.

An EPM signal is another electrical controller which in this case controls the contactor which brings 115V ac external power onto the aircraft. In this case it is a common design to the GCUs.

A POR signal (e.g., POR Phase A) is the Phase A voltage sense received by the controller which is used as the control input for closed loop voltage control. It represents one voltage sense that in non-faulted conditions denotes the presence of AC voltage at the input of the TRU.

Other signals (e.g., AC_V Sense which is an alternate AC Voltage sense input) may be on the electrical bus directly upstream of the TRU, that provides a separate indication of the presence of AC voltage at the input of the TRU.

All of the above examples (and others) can be thought of as hardware circuit signals that ensure that a software error cannot cause an improper operation of a contactor. This list is not meant as limiting. The above signals can also be used to control logic on the output of the interlock circuity for more advanced control/redundancy as shown by way of illustration in FIG. 4.

Further, it shall be understood that the contactor control circuitry 150 can provide contactor enable signals to additional contactor systems 100.

Figure 3:
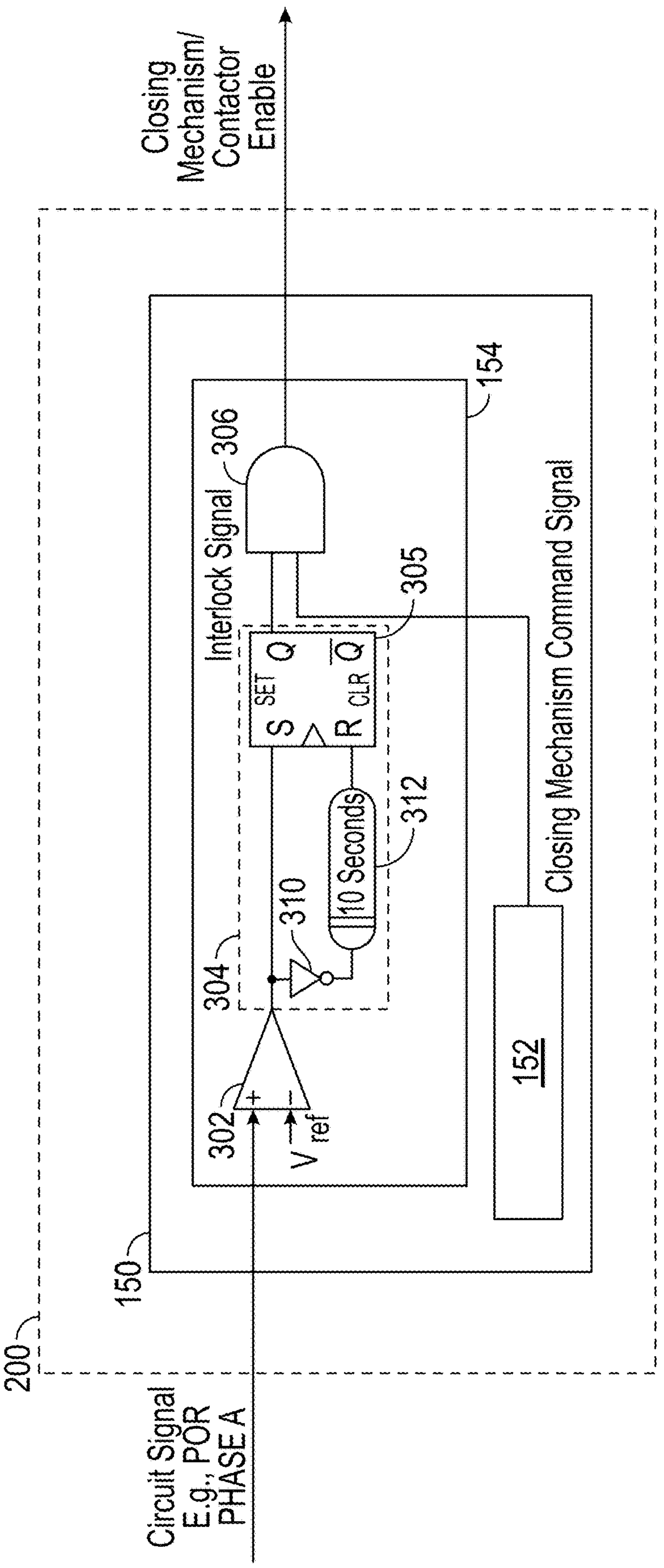
FIG. 3 shows a circuit diagram of hardware contactor control/enable according to embodiments.

In one example as shown in FIG. 3, the contactor control circuitry 150 is part of a generator controller 200. The control circuit 150 can, therefore, have access to any value that is used by the controller such as, for example, the signals described above. For simplicity, those and other signals are denoted as "circuit signal" in FIG. 3.

The interlock circuit 150 receives the circuit signal and compares it to reference voltage. While a reference voltage is shown and discussed, the reference could also be a current depending on the context. In the illustrated example, a comparator 302 is provided to perform the comparison and compares it to a reference voltage reference (Vref). The output of the comparator 302 is provided to a latch 304 that holds the value of the comparator 302 until it is reset.

Several different kinds of latches 304 can be utilized. In FIG. 3 the latch 304 includes an S/R latch 305. The set (S) input of the S/R latch 305 coupled to the output of the comparator 302. This will keep the output (Q) in a state that matches input until it is reset by a signal on the reset (R) input going high. In this case, when the S input is high and reset signal R goes low, Q is driven high. This conditional will remain until R goes high. The illustrated latch 304 include an inverter 310 and a delay 312 connected serially between the output of the comparator 302 and the (Vref).

Operating in this manner ensures that Q provides an interlock signal that is formed in hardware and is based on an existing required circuit condition. The interlock signal can then be compared to the closing mechanism command signal at output logic such as AND gate 306. If the two are equal this means that the hardware is a ready position to operate in accordance with the software determined closing mechanism command signal. In such a state, the contactor enable signal can be provide to the contactor. This signal can by itself or with other circuit elements be used to control, for example, the solenoid 111 shown in FIG. 2.

Figure 4:
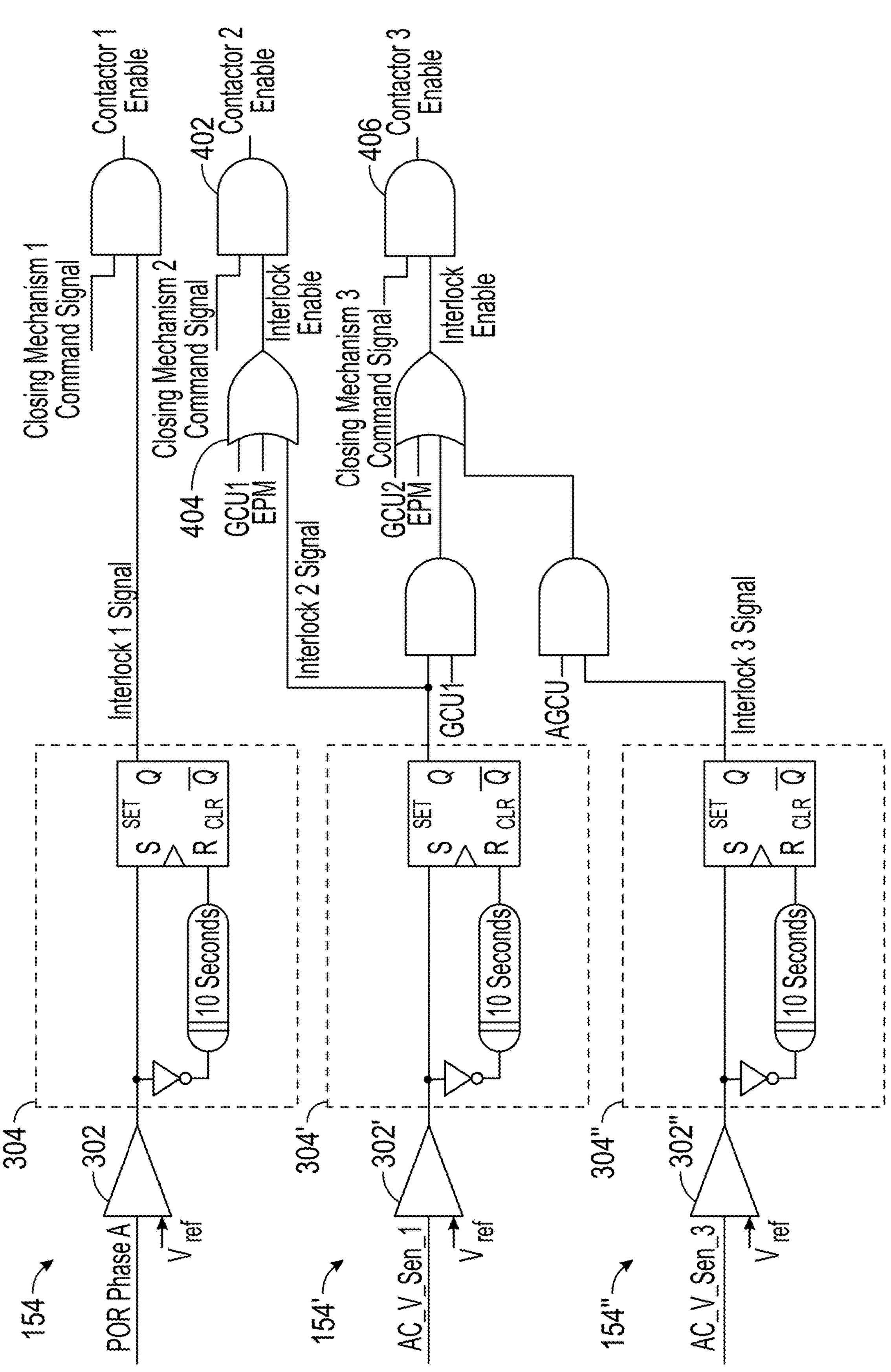
FIG. 4 shows multiple circuits from FIG. 3 integrated together to perform more complex control.

In the above example, a single circuit was used to control a single contactor. A similar concept can be extended to applications where a common LRU is used in different locations with different functions assigned to different contactors pending the LRU location. An example of this is shown in FIG. 4. In FIG. 4, LRU location pin programming may determine if the hardware protective function can be enabled or is bypassed.

Examples of such pin programming are utilized downstream of the latch portion of each interlock. In FIG. 4 three interlock circuits 154, 154' and 154" are shown. Interlock 154 is the same as in FIG. 3 and operates as above. The comparison/comparators portion 302', 302" and the latch portions 304', 304" are also the same as in FIG. 4 except that they may include different circuit signals as inputs to the comparator. For example, the second interlock 154' can receive a first of two AC voltages (AC_V_Sen_1) and the third interlock 154" can receive a second of two AC voltages (AC_V_Sen_3). The voltages can be, for example, measured from a bus upstream of the contactor to ensure the bus has power before being connected to the generator.

The output of the second interlock 154' (c) can then be compared to a closing mechanism 2 signal that is a software created in hardware (e.g, in hardware at AND gate 402). If both are the same, the contactor 2 enable can be driven high as above. Further, other pins related to the status of, for example, a generator can override the interlock 2 signal. For example, an override in the form of an OR gate 404 that can "allow" the software closing mechanism command signal to go through if any input thereto is enabled. In the example shown, the inputs can include a EPM or GCU locating identifying pin programming signal and is labeled as interlock enable in FIG. 4.

Other permutations are also possible without departing from the disclosed embodiments. For example, in FIG. 4 the output of the second and third interlocks 154', 154" can be provided to various other logic gates to create a contactor 3 enable based on a comparison with the closing mechanism 3 command signal.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A closing mechanism controller comprising:

contactor operating logic that generates a software or firmware based closing mechanism command signal; and hardware interlock circuitry that generates an interlock signal, the hardware interlock circuitry being configured to compare the interlock signal to the software or firmware based closing mechanism command signal and to provide an enable signal to the software or firmware based closing mechanism when the interlock signal matches the closing mechanism command signal;

wherein the interlock signal is based on a circuit signal (AC_V_Sen) related to a circuit that is affected by closing the closing mechanism; and wherein the circuit signal indicates the presence of an AC voltage at an input of a transformer.

2. A closing mechanism controller comprising:

contactor operating logic that generates a software or firmware based closing mechanism command signal; and hardware interlock circuitry that generates an interlock signal, the hardware interlock circuitry being configured to compare the interlock signal to the software or firmware based closing mechanism command signal and to provide an enable signal to the closing mechanism when the interlock signal matches the software or firmware based closing mechanism command signal;

wherein the interlock signal indicates that external power is being provided onto an aircraft.

3. The closing mechanism controller of claim 2, wherein the closing mechanism is a contactor and the hardware interlock circuitry generates a contactor enable signal.

4. The closing mechanism controller of claim 3, wherein the hardware interlock circuitry includes a comparator, a latch and output logic.

5. The closing mechanism controller of claim 4, wherein the comparator compares the circuit signal to a reference value and generates a comparison signal based on the comparison.

6. The closing mechanism controller of claim 5, wherein the latch latches in the comparison signal if the comparison signal is positive for longer than a predetermined time such that the comparison signal is provided as the interlock signal on an output of the latch.

7. The closing mechanism controller of claim 6, wherein the output logic compares the interlock signal to the software or firmware based closing mechanism command signal to generate the enable signal.

8. The closing mechanism controller of claim 6, further comprising an override element connected between an output of the latch and the output logic, wherein the override element is connected to one or more additional circuit signals and the interlock signal and will provide a positive output if any of the additional circuit signals or the interlock signal is positive.

9. A contactor system comprising:

a contactor that connects an input to an output based on a contactor enable signal; and a closing mechanism contactor closing controller as recited in claim 4.

10. The contactor system of claim 9, wherein the output is connected to a bus bar and the input is connected to a generator.

11. The contactor system of claim 10, wherein the closing mechanism controller is part of a generator control unit of the generator.

12. The contactor system of claim 9, wherein the closing mechanism controller is part of a bus power control unit.

13. The contactor system of claim 9, wherein the closing mechanism controller is part of a motor control unit.

14. The contactor system of claim 9, wherein the closing mechanism controller is part of an inverter control unit.

15. A closing mechanism controller comprising:

contactor operating logic that generates a software or firmware based closing mechanism command signal; and hardware interlock circuitry that generates an interlock signal, the hardware interlock circuitry being configured to compare the interlock signal to the software based closing mechanism command signal and to provide an enable signal to the closing mechanism when the interlock signal matches the closing mechanism command signal;

wherein the interlock signal is based on a circuit signal related to a circuit that is affected by closing the closing mechanism;

wherein the closing mechanism is a contactor and the hardware interlock circuitry generates a contactor enable signal;

wherein the hardware interlock circuitry includes a comparator, a latch and output logic;

wherein the comparator compares the circuit signal to a reference value and generates a comparison signal based on the comparison;

wherein the latch latches in the comparison signal if the comparison signal is positive for longer than a predetermined time such that the comparison signal is provided as the interlock signal on an output of the latch;

wherein the latch includes an S-R flip flop;

wherein the comparison signal is connected to a set (S) input of the S-R flip flop and an inverted and delayed version of the comparison signal is connected to a reset (R) input of the S-R flip flop.

16. The closing mechanism controller of claim 15, wherein the interlock signal is provided on a Q output of the S-R flip flop.

* * * * *